(12) United States Patent
Godbillon et al.

(10) Patent No.: US 10,317,037 B2
(45) Date of Patent: Jun. 11, 2019

(54) LIGHT MODULE FOR LIGHTING AND/OR SIGNALING FOR MOTOR VEHICLES

(71) Applicant: Valeo Vision, Bobigny (FR)

(72) Inventors: Vincent Godbillon, Paris (FR); Jean-Claude Puente, Livry Gargan (FR)

(73) Assignee: VALEO VISION, Bobigny (FR)

( * ) Notice: Subject to any disclaimer, the term of this patent is extended or adjusted under 35 U.S.C. 154(b) by 170 days.

(21) Appl. No.: 15/320,518

(22) PCT Filed: Jul. 27, 2015

(86) PCT No.: PCT/EP2015/067126
§ 371 (c)(1),
(2) Date: Dec. 20, 2016

(87) PCT Pub. No.: WO2016/016175
PCT Pub. Date: Feb. 4, 2016

(65) Prior Publication Data
US 2018/0119916 A1 May 3, 2018

(30) Foreign Application Priority Data

Jul. 31, 2014 (FR) .................................. 14 57418

(51) Int. Cl.
| | |
|---|---|
| B60Q 1/00 | (2006.01) |
| B60Q 1/26 | (2006.01) |
| F21V 8/00 | (2006.01) |
| F21S 43/14 | (2018.01) |
| F21S 43/239 | (2018.01) |
| F21S 43/241 | (2018.01) |
| F21S 43/243 | (2018.01) |
| F21S 43/249 | (2018.01) |

(52) U.S. Cl.
CPC .......... *F21S 43/249* (2018.01); *B60Q 1/0041* (2013.01); *B60Q 1/2607* (2013.01); *F21S 43/14* (2018.01); *F21S 43/239* (2018.01); *F21S 43/241* (2018.01); *F21S 43/243* (2018.01); *G02B 6/0008* (2013.01); *G02B 6/0011* (2013.01); *G02B 6/0068* (2013.01); *G02B 6/0076* (2013.01)

(58) Field of Classification Search
CPC ... B60Q 1/0041; B60Q 1/2607; F21S 43/235; F21S 43/239; F21S 43/241; F21S 43/243; F21S 43/249; F21S 43/14; B02B 6/0076
See application file for complete search history.

(56) References Cited

U.S. PATENT DOCUMENTS

| | | | |
|---|---|---|---|
| 7,210,815 B2 | 5/2007 | Imade | |
| 7,224,501 B2 | 5/2007 | Kojima | |
| 7,486,885 B2 * | 2/2009 | Tenmyo | ............... G02B 6/0001 362/16 |

(Continued)

FOREIGN PATENT DOCUMENTS

WO 2010044030 A1 4/2010

*Primary Examiner* — Peggy A Neils
(74) *Attorney, Agent, or Firm* — Oblon, McClelland, Maier & Neustadt, L.L.P.

(57) ABSTRACT

A light module for motor vehicles comprising two light sources and a light guide in which there is arranged a device for controlling the propagation of light in the light guide, in order make it possible to obtain original light effects at the outlet of the light guide.

20 Claims, 5 Drawing Sheets

(56) References Cited

U.S. PATENT DOCUMENTS

| | | | |
|---|---|---|---|
| 7,600,905 B2 * | 10/2009 | Geiger | B60Q 1/2665 |
| | | | 362/494 |
| 7,914,195 B2 | 3/2011 | Sawada et al. | |
| 8,801,242 B2 | 8/2014 | Hamm et al. | |
| 9,464,785 B2 * | 10/2016 | Kumar | B60Q 1/00 |
| 9,651,211 B2 * | 5/2017 | Potter | F21S 41/24 |
| 2005/0002110 A1 | 1/2005 | Imade | |
| 2006/0209417 A1 | 9/2006 | Kojima | |
| 2006/0234612 A1 * | 10/2006 | Gotthardt | B60Q 1/0683 |
| | | | 452/58 |
| 2009/0219734 A1 | 9/2009 | Sawada et al. | |
| 2011/0199780 A1 | 8/2011 | Jak et al. | |
| 2012/0275173 A1 | 11/2012 | Hamm et al. | |

* cited by examiner

LIGHT MODULE FOR LIGHTING AND/OR SIGNALING FOR MOTOR VEHICLES

CROSS-REFERENCE TO RELATED APPLICATIONS

This application is the U.S. National Phase application of PCT Application No. PCT/EP2015/067126 filed Jul. 27, 2015, which claims priority to the French application 1457418 filed on Jul. 31, 2014, which applications are incorporated herein by reference and made a part hereof.

BACKGROUND OF THE INVENTION

1. Field of the Invention

The invention relates to the field of light modules, notably for lighting and/or signaling for motor vehicles.

2. Description of the Related Art

Light modules according to the generic definition of them by the above preamble are known, for which the first and second light outlet zones are totally merged. Considering that just one of the two sources can emit or that both of the sources can emit at the same time, only three light effects can be obtained:

the light coming from the first source is emitted at the outlet of the guide through the first and second zones of the light outlet,
the light coming from the second source is emitted at the outlet of the guide through the first and second zones of the light outlet, and
a mixture of the light coming from the first and second sources is emitted at the outlet of the guide through the first and second zones of the light outlet.

SUMMARY OF THE INVENTION

In this context, the present invention proposes a light module, notably for lighting and/or for signaling for motor vehicles, making it possible to obtain original light effects.

The invention relates more particularly to a light module, notably for lighting and/or signaling for motor vehicles, comprising:
a light guide comprising at least first and second light inlet zones and at least first and second light outlet zones,
a first light source arranged opposite the first inlet zone
a second light source arranged opposite the second inlet zone,
the guide being arranged so that the light coming from the first and second light sources is able to propagate in the guide to first and second zones of the outlet respectively.

For this purpose, the light module of the invention, otherwise according to the generic definition of it given by the above preamble, is essentially such that it comprises a first device for controlling the propagation of light in the guide, the first control device being arranged so that the second outlet zone partially overlaps the first outlet zone.

The light module thus makes it possible to obtain new light effects.

It should be noted that the first and second inlet zones can be disposed on a common inlet of the guide. As a variant, each inlet can be disposed on a separate inlet branch of the guide.

It should also be noted that the light sources can be capable of emitting light in a same general direction of emission.

More particularly, the first control device can comprise confinement means for confining the propagation of the light coming from the second source and for freely allowing the propagation of the light coming from the first source.

Advantageously, the light guide can extend longitudinally, that is to say in the direction of the propagation of the light emitted by the light sources, in a main direction. In this case the confinement means can be oriented in a direction forming an angle with this main direction.

According to a particular embodiment, the first and second outlet zones have a part of their periphery in common.

According to a first feature of the confinement means, the latter comprise at least one cavity formed in the guide and disposed so as to reflect totally the light coming from the second source and propagating until it reaches the cavity.

According to a second feature of the confinement means, the latter comprise at least one opaque or reflective insert, included in the guide, and able to absorb and/or, respectively, to totally reflect the light coming from the second source and propagating until it reaches the insert.

According to a third feature of the confinement means, the latter comprise a plurality of the cavities and/or of the inserts disposed in louvered manner substantially on a median plane separating the first and second inlet zones.

According to a feature of the first control device, the latter comprises a notch formed in the guide and separating the first and second inlet zones.

According to a feature of the guide, the latter comprises:
a first branch defined between the first inlet zone and the part of the first outlet zone not overlapped by the second outlet zone, and
a second branch defined between the second inlet zone and the second outlet zone,
the two branches being joined to each other by a junction surface less extensive than the surface of the second branch comprising the junction surface.

In this case, the first device for controlling the propagation of light in the guide can be arranged at the level of the junction surface of the two branches.

Advantageously, the confinement means extend transversely over the whole of the width of the first branch.

The guide according to this feature can comprise a second device for controlling the propagation of light. This second control device comprises confinement means arranged in the second branch substantially under a long edge of the junction surface in order to confine the propagation of the light coming from the first source in such a way that the first and second outlet zones overlap over a delimited zone of the second outlet zone.

The guide according to this feature can moreover be such that the surface of the second branch comprising the junction surface between the two branches is turned back over itself in such a way that the second branch substantially forms a ring.

According to a feature of the light module according to the invention, the first and second sources have lighting and/or signaling functions which are different from each other.

For example, the first source makes it possible to provide a direction indicator (or flasher lights) function and the second source makes it possible to provide a daytime driving lights function. The first source then emits an amber or yellow colored light and the second source emits a white light. Advantageously, the second source can moreover be associated with a position light function, it being possible for the light power emitted by this source in order to carry out this function to be reduced with respect to the power necessary for carrying out the daytime driving lights function. The first and second sources can also be disposed on a common support.

These and other objects and advantages of the invention will be apparent from the following description, the accompanying drawings and the appended claims.

BRIEF DESCRIPTION OF THE ACCOMPANYING DRAWINGS

Other features and advantages of the invention will become clearly apparent from the description given below by way of indication and in no way limiting and with reference to the appended drawings, in which.

DETAILED DESCRIPTION OF THE PREFERRED EMBODIMENTS

Figure 1:
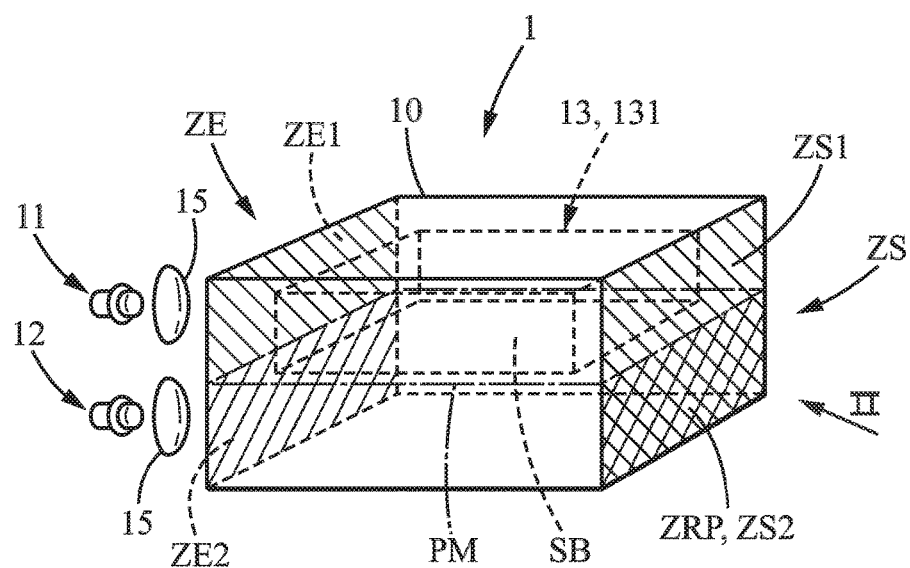
FIG. 1 shows a perspective and transparent view of a light module according to the invention comprising a light guide according to a first embodiment.

In its widest acceptance, the light module 1, notably for lighting and/or signaling for motor vehicles, according to the invention comprises:
  a light guide 10,
  a first light source 11,
  a second light source 12, and
  a first control device 13 for controlling the propagation of light in the light guide 10.

The light guide 10 can be defined as a waveguide allowing the guidance of an optical signal. It can be composed of a dielectric material, such as polycarbonate or polymethyl methacrylate (often abbreviated as PMMA, standing for Polymethyl Methacrylate in English).

As shown notably in FIG. 1, the light guide 10 comprises a light inlet ZE and a light outlet surface ZS. The first light source 11 is arranged opposite a first inlet zone ZE1 of the light inlet surface ZE and the second light source 12 is arranged opposite a second inlet zone ZE2 of the inlet surface ZE. The light guide 10 can extend longitudinally, that is to say in the direction of propagation of the light emitted by the first and second light sources 11, 12, in a main direction. In this case, and as will be seen below, the confinement means can be oriented in a direction forming an angle with this main direction.

The light coming from the first and second light sources 11, 12 is able to propagate in the light guide 10. The light coming from the first light source 11 propagates in the light guide 10 until it leaves it through first inlet zone ZE1 of the outlet surface ZS of the light guide 10; the light coming from the second light source 12 propagates in the light 10 until it leaves it through the second inlet zone ZS2 of the outlet surface ZS of the light guide 10.

Due to the intrinsic properties of the light guide 10, no light or at least no significant amount of light leaves the light guide 10 through an external surface of the light guide 10 other than the outlet surface ZS. In fact, the light coming from the first and second light sources 11,12 which has propagated to an external surface of the light guide 10 different from the outlet surface ZS is totally reflected by that surface and is thus confined in the light guide 10. For this purpose the light coming from the first and second light sources 11,12 preferably comprises a beam of light rays substantially parallel with each other which propagates in a direction substantially perpendicular to the inlet ZE of the light guide 10.

Each light source 11,12 may not be intrinsically capable of emitting a beam of light rays that are sufficiently parallel with each other in the direction of the inlet surface ZE of the light guide 10. For example the light source 11,12 can be diffused. In another example, the light source 11, 12 can be arranged sufficiently far from the inlet surface ZE of the light guide 10 that a large portion of the light rays risks being lost because it does not strike the inlet surface ZE of the light guide 10 but passes beside the light guide 10. In these cases, a collimator 15 can be arranged, in the way shown in FIG. 1, between the light source 11, 12 and the corresponding inlet zone ZE1, ZE2, in order to obtain, from that light source 11, 12, a beam of light rays that are sufficiently parallel with each other at the inlet of the inlet zone ZE1, ZE2.

The inlet surface ZE and outlet surface ZS can be substantially opposite each other such as shown in FIG. 1. However, this arrangement of the inlet surface ZE and outlet surface ZS with respect to each other is not limitative; for example they can also be opposite each other only with respect to a main direction of propagation of the light in the light guide 10, it being possible for this main direction of propagation to deviate from a simple straight line. For example, in the case of a guide exhibiting a curvature, the latter can cause the rays to progressively change the general direction of propagation.

Figure 4:
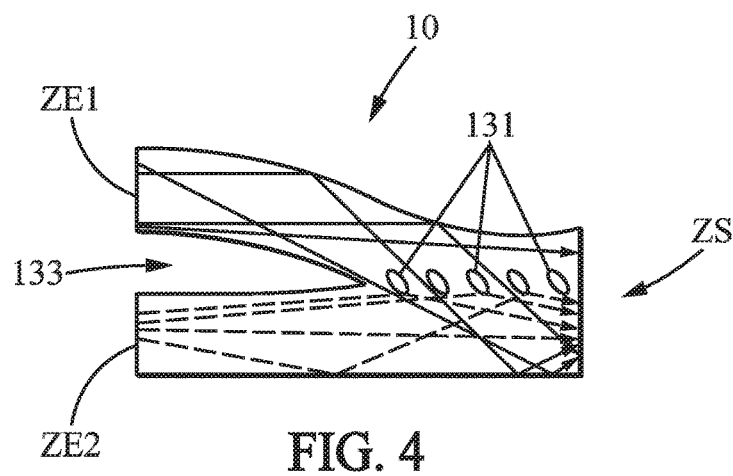
FIG. 4 shows a perspective and transparent view of a light guide according to a third embodiment.

The first and second inlet zones ZE1 and ZE2 do not overlap each other. They can be joined to one another, for example by a part of their periphery, as shown in FIG. 1, or they can be separated, as shown in FIG. 4. Moreover, they can extend substantially in the same way over the inlet surface ZE, such as shown in FIG. 1, or on the contrary in largely different ways over that same surface, such as shown for example in FIGS. 6 to 9. In the examples illustrated by the drawings, the first and second inlet zones ZE1 and ZE2 together cover the whole of the inlet surface ZE of the light guide 10, but this illustration is not limitative; for example it would be possible for a part of the inlet surface ZE of the light guide 10 not to be arranged opposite a light source 11, 12.

The first control device 13 for controlling the propagation of light in the light guide 10 is arranged in such a way that the second outlet zone ZS2 partially overlaps the first outlet zone ZS1. The partial overlapping of each other of the first and second outlet zones ZS1 and ZS2 means that these zones are neither separate nor totally merged. More particularly, the second outlet zone ZS2 only partially overlaps the first outlet zone ZS1.

Figure 2:
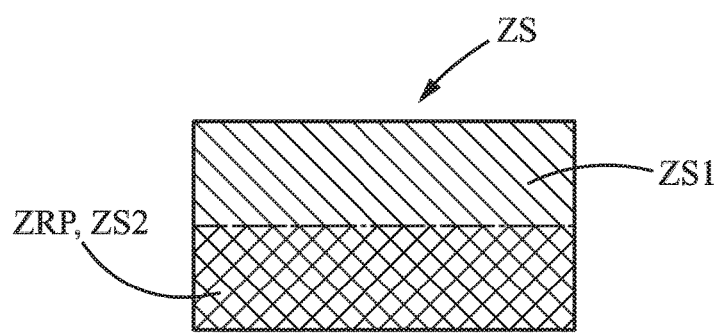
FIG. 2 shows a front view of the light guide according to FIG. 1.

In the example shown in FIG. 2, the first outlet zone ZS1 (the zone hatched from top to bottom and from left to right) occupies the whole of the outlet surface ZS of the light guide 10, whilst the second outlet zone ZS2 (the zone hatched from top to bottom and from left to right) occupies only a part of it. In this example also, the first outlet zone ZS1 entirely covers the second outlet zone ZS2. Again in this example, the first and second outlet zones ZS1, ZS2 have a part of their periphery in common. This latter feature can have a certain advantage in terms of light effect, as will be described in detail below.

The partial overlapping of the first and second outlet zones ZS1 and ZS2 can be obtained because the first control device 13 comprises confinement means 131, 132. These confinement means 131, 132 more particularly make it possible to confine, in a part of the light guide 10, the propagation of the light coming from the second light source 12 and to allow the free propagation, in the light guide 10, of the light coming from the first light source 11. Thus, when only the second light source 12 is emitting light into the light guide 10, the light is emitted at the outlet of the light guide 10 through only one part of the outlet surface ZS of the light guide 10, namely the second outlet zone ZS2.

FIG. 1 shows a perspective and transparent view of a light module 1 according to the invention comprising a light guide 10 according to a first embodiment.

According to this first embodiment, the confinement means comprise a cavity 131 formed in the light guide 10. This cavity 131 is disposed so as to totally reflect the light coming from the second light source 12 and propagating until it reaches it.

More particularly, the cavity 131 can occupy a significant part of the light guide 10 situated between the first inlet zone ZE1 and the part of the outlet surface ZS not overlapped by the second outlet zone ZS2. It can moreover substantially have the shape of this part of the light guide 10. Its surface SB (bottom surface of the parallelepiped forming the cavity 131 in FIG. 1) intended for reflecting totally the light coming from the second light source 12 is situated substantially at the level of, and preferably slightly below, a median plane PM separating the first and second inlet zones ZE1 and ZE2.

Thus, the light coming from the second light source 12 reaches the cavity 131 through this surface SB and according to an angle of incidence greater than a critical angle given by the Snell-Descartes law, this law involving the refraction indices of the media involved. In this case, the constitutive material of the light guide 10 has an index of refraction close to 1.4-1.6. More precisely, PMMA has an index of refraction equal to 1.49 and polycarbonate has an index of refraction equal to 1.59 and the air contained in the cavity 131 has an index of refraction close to 1. Therefore, the critical angle is about 40° and is more particularly equal to 39° for polycarbonate and equal to 42° for PMMA. It is apparent that the light coming from the second light source 12 is totally reflected when it reaches the cavity 131 and is consequently confined in the part of the light guide 10 situated under the cavity 131, so that it is only emitted through the second outlet zone ZS2 of the outlet surface ZS of the light guide 10.

With regard to the light coming from the first light source 11, this reaches the cavity 131 through a face substantially perpendicular to its direction of propagation and is therefore transmitted into the cavity 131. Each ray thus transmitted is deflected by an angle again determined by the Snell-Descartes law. Certain rays reach the opposite face of the cavity 131 directly and are again transmitted to the outlet surface ZS of the light guide 10. Other rays are reflected and transmitted by the internal surfaces of the light guide 10, and notably by the surface SB of the cavity 131. The light coming from the first light source 11 can therefore propagate at least by transmission in the part of the light guide 10 situated under the surface SB of the cavity 131. Thus, the light coming from the first light source 11 can leave the light guide 10 through the whole of the outlet surface ZS of the light guide 10.

New light effects are thus obtained, which consist of:
limiting the emission of light at the outlet of the light guide 10 to the second outlet zone ZS2 of the outlet surface ZS of the light guide 10, when only the second light source 12 is emitting light into the light guide 10,
emitting a mixture of light coming from the first and second light sources 11, 12 through just the the second outlet zone ZS2 of the outlet surface ZS of the light guide 10, when the first and second light sources 11, 12,are emitting light into the light guide 10, and
emitting only the light coming from the through the first outlet zone ZS1 of the outlet surface ZS of the light guide 10, when the first and second light sources 11, 12 are emitting light into the light guide 10.

The same light effects are obtained by the light module 1 according to the various other embodiments described below.

Figure 3A:
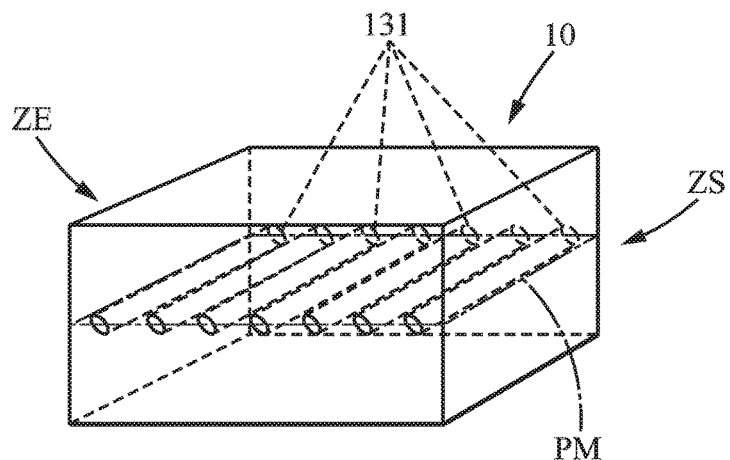
FIG. 3A shows a perspective and transparent view of a light guide according to a second embodiment.

FIG. 3A shows a perspective and transparent view of a light guide 10 according to a second embodiment.

According to this second embodiment, the confinement means comprise a plurality of cavities 131 disposed in a louvered manner substantially at the level of the median plane PM separating the first and second inlet zones ZE1, ZE2.

Figure 3B:
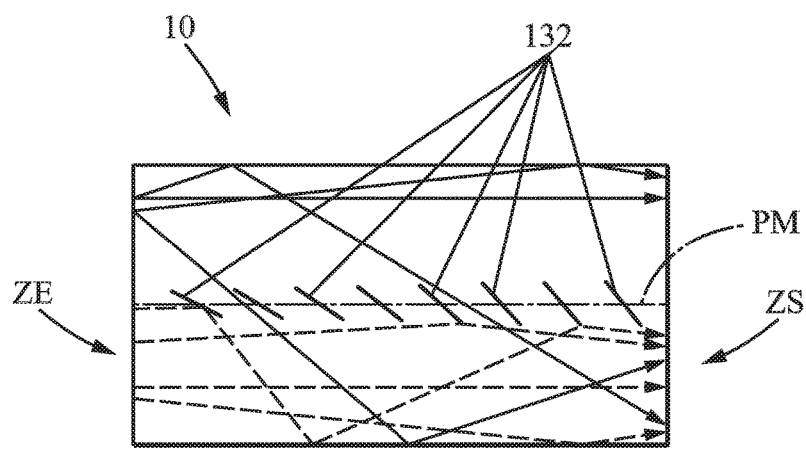
FIG. 3B shows a cross-sectional and transparent view of a light guide according to a variant of its second embodiment.

According to a variant of this second embodiment, shown in FIG. 3B, the confinement means comprise a plurality of inserts 132 disposed in louvered manner substantially on a median plane PM. Each insert 132 included in the light guide 10 can more particularly be opaque or reflective. It is thus capable of absorbing and/or of totally reflecting the light coming from the second light source 12 and propagating unit it reaches it.

In plastics technology, an insert 132 refers to a part made from infusible material included in the manufactured part, in this case the light guide 10. For example, each insert 132 can comprise a metal or graphite. It should be noted that the absorption capability of the insert 132 can depend on the wavelength of the light reaching the insert 132 and on the color of the insert 132.

That the cavities 131 or inserts 132 are disposed in louvered manner suggests that each of the cavities 131 or each of the inserts 132 has the appropriate shape and dimensions to allow this particular disposition.

Another variant (not shown) is envisaged which consists of disposing a plurality of cavities 131 and of inserts 132 in the light guide 10 in a louvered manner, for example in alternation.

More particularly, the cavities 131 (or the inserts 132) extend substantially from a lateral face to an opposite lateral face of the light guide 10. Their louvered arrangement makes it possible to allow the passage of the light coming from the first light source 11 and to oppose the passage of the light coming from the second light source 12. In fact, as shown in FIG. 3B and in FIG. 4, rays of light coming from the first light source 11 (solid line) can pass through the gaps between the cavities 131. On the contrary, rays coming from the second light source 12 (lines drawn in long dashes) do not "see" gaps between the cavities 131 and necessarily reach one of the latter where they are totally reflected (and/or totally absorbed); these rays are thus confined in the part of the light guide 10 situated under the cavities 131.

As shown in FIG. 3B, the angle of the inserts 132 (or of the cavities 131) with respect to the median plane PM can vary as a function of the distance to the inlet surface ZE of the light guide 10. More particularly, the angle of the inserts 132 (or of the cavities131) with respect to the median plane PM can increase as the insert 132 is becomes more distant from the inlet surface ZE of the light guide 10. In fact, notably in the case where a total reflection of the light coming from the second light source 11 is sought (as opposed to an absorption), a condition, referred to as a condition of incidence, to be met is that the rays coming from that source reach the inserts 132 with an angle of incidence greater than the critical angle already mentioned above; now, the greater the distance of an insert 132 from the inlet of the light guide 10 is, the more the rays likely to reach it directly have a low angle of propagation with respect to the median plane PM. Consequently, in order to meet the incidence condition, the angle formed with the median plane PM by an insert 132 distant from the inlet of the light guide 10 can be higher than the angle that an insert 132 closer to the inlet must form.

It should be noted moreover that it can also be advantageous to reduce the angle of the inserts 132 (or of the cavities 131) with respect to the median plane PM as the insert 132 becomes more distant from the inlet surface ZE of the light guide 10. This makes it possible for a larger amount of rays coming from the first light source 11 to propagate directly (without striking the cavities or the inserts) to the outlet zone ZS2. Those skilled in the art will be aware of the compromise to be adopted on a case by case basis.

FIG. 4 is a perspective and transparent view of a light guide 10 according to a third embodiment.

Relative to the light guide 10 according to the second embodiment described above, the light guide 10 according to the third embodiment comprises moreover a notch 133 formed in the light guide 10. The notch 133 can more particularly be comprised in the first control device 13. It should be noted however that the confinement of the light coming from each source at the level of the notch 133 is related solely to the intrinsic properties of the light guide 10 which is disjoint at this level.

The first and second inlet zones ZE1, ZE2 are thus separate from each other, which can make it possible to facilitate the arrangement of the light sources 11, 12 opposite these zones.

Figure 5:
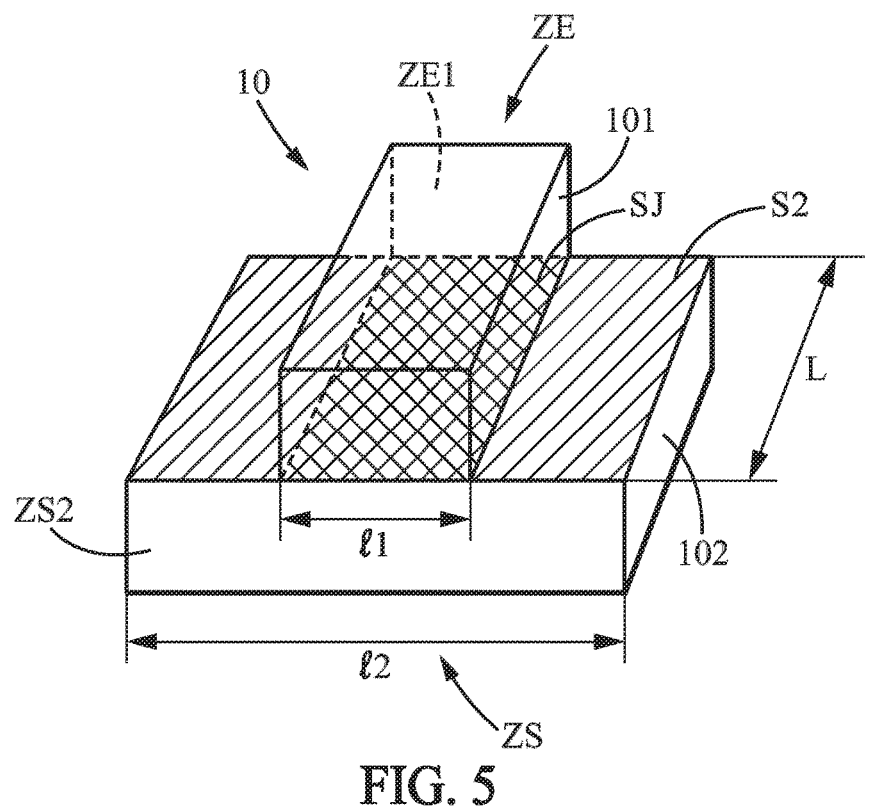
FIG. 5 shows a perspective and transparent view of a light guide according to a fourth embodiment.
Figure 6:
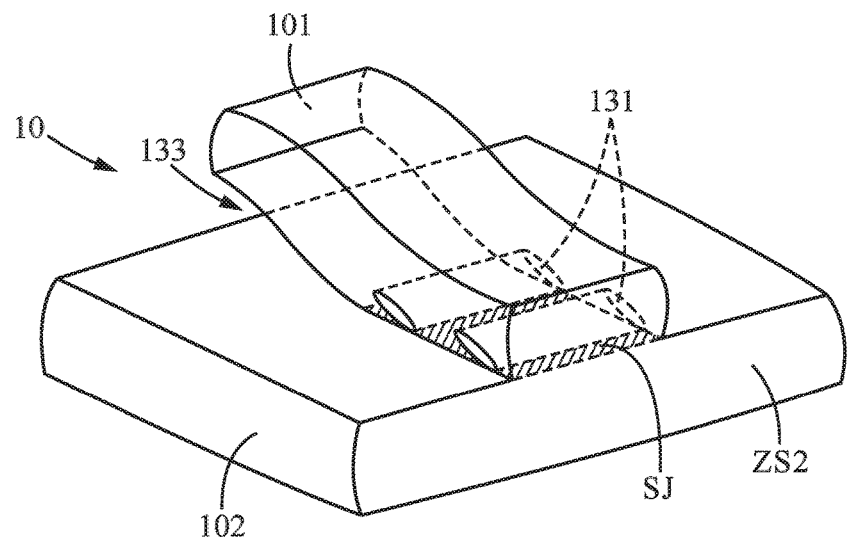
FIG. 6 shows a perspective and transparent view of a light guide according to a fifth embodiment.
Figure 7:
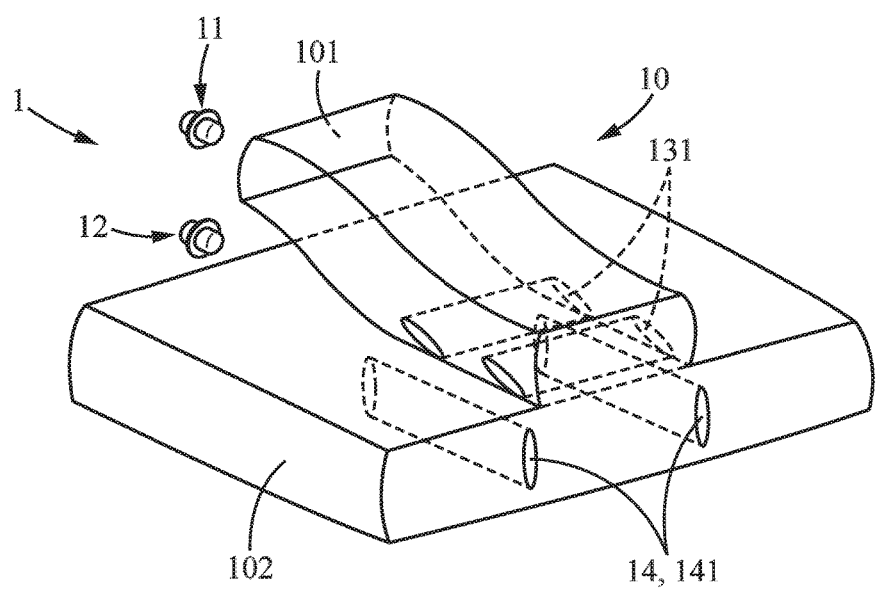
FIG. 7 shows a perspective and transparent view of a light guide according to a variant of its fifth embodiment.

FIG. 5 is a perspective and transparent view of a light guide 10, or at least of a part of a light guide 10, according to a fourth embodiment; no device for controlling the propagation of the light is shown in it however. This figure is principally intended to illustrate the particular shape of the light guide 10 according to the fourth embodiment, notably relative to the shape of the light guide 10 according to the first and second embodiments described above. Moreover, light guide 10 comprising a part having the shape shown in FIG. 5 is shown in FIGS. 6 and 7 in which the confinement means 131 of the first control device 13 are also shown.

Thus, as shown in FIG. 5, the light guide 10 according to the fourth embodiment comprises:
 a first branch 101 defined between the first inlet zone ZE1 and the part of the first outlet zone ZS1 not overlapped by the second outlet zone ZS2, and
 a second branch 102 defined between the second inlet zone ZE2 and the second outlet zone ZS2.

The first and second branches 101, 102 are joined to each other by a junction surface SJ and the first control device 13 for controlling the propagation of the light in the light guide 10 is arranged at the level of the junction surface SJ of the first and second branches 101, 102.

This junction surface SJ is less extensive than the surface S2 of the second branch 102 comprising the junction surface SJ. More particularly, defining a length L of the light guide 10 between its inlet and its outlet and defining a width I of the light guide 10 between its opposite lateral faces, the first and second branches 101, 102 can have the same length L, but the width l1 of the first branch 101 is less than the width l2 of the second branch 102.

As shown in FIG. 6, a light guide 10 according to a fifth embodiment can comprise moreover, relative to the light guide 10 according to the fourth embodiment, the notch 133 such as discussed above with reference to FIG. 4. The latter can moreover be considered as a cross-sectional and transparent view of a light guide 10 according to the fifth embodiment shown in FIG. 6. In particular, it is noted that the confinement means 131 of the first control device 13 are shown in this FIG. 6 as being arranged at the level of, and preferably slightly above, the junction surface SJ.

It should be noted that as the light coming from the first light source 11 is free to propagate in the second branch 102, this light can, according to the fifth embodiment, leave the waveguide through the whole of the second outlet zone ZS2. This can be an additional sought light effect or, on the contrary, an undesirable light effect. If the effect is undesirable, a solution can be applied to it according to the variant of the fifth embodiment of the light guide 10 as described below with reference to FIG. 7.

As shown in FIG. 7, light guide 10 in this general form shown in FIG. 5 can more particularly comprise a second device 14 for controlling the propagation of light.

This second control device 14 can comprise appropriate confinement means 141, arranged in the second branch 102 for confining the propagation of the light coming from the first light source 11. The confinement means 141 can more particularly be arranged substantially under a long edge of length L (shown in FIG. 5) of the junction surface SJ (identical to the one shown in FIG. 6).

Figure 8:
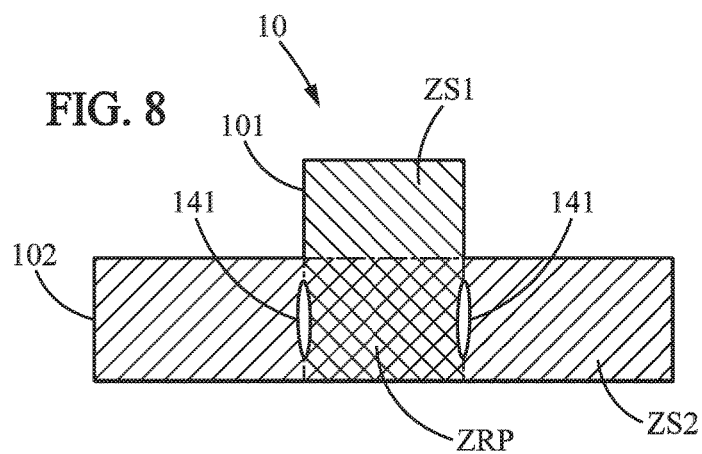
FIG. 8 shows a front view of the outlet of the light guide according to FIG. 7.

As illustrated in FIG. 8 which shows a front view of the outlet of the light guide 10 shown in FIG. 7, and according to the same principle as the confinement described above carried out by the first control device 13, the first and second outlet zones ZS1, ZS2 thus overlap over a delimited zone ZRP of the second outlet zone ZS2. The first and second outlet zones ZS1, ZS2 therefore have in common just the part of their periphery consisting of an edge (bottom in the figure) of the partial overlap delimited zone ZRP. The advantage in terms of light effect is that the light coming from the first light source 11 is prevented from propagating in the lateral parts of the second branch 102 and exiting over a zone that is more extensive than the partial overlap delimited zone ZRP. In the case where the first and second light sources 11, 12 have different colors, the advantage in terms of light effect is more particularly to prevent the light coming from the first light source 11 from creating a gradation of colors at the level of the second outlet zone ZS2.

It should be noted that the centered aspect in the width of the first and second branches 101, 102 shown in FIGS. 5 to 8 is a purely illustrative choice and is in no way limiting.

Figure 9:
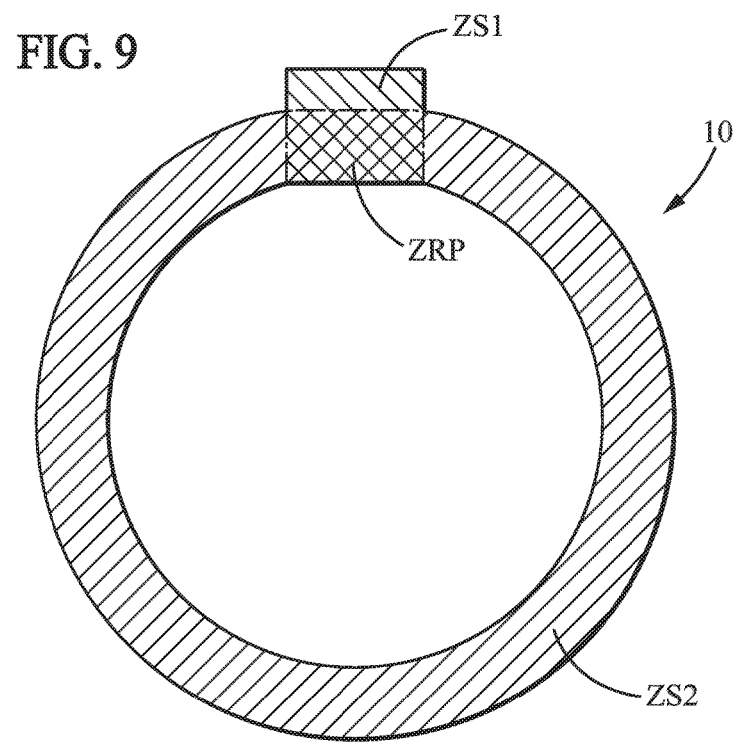
FIG. 9 shows a front view of a light guide according to a sixth embodiment.

FIG. 9 shows a front view of a light guide 10 according to a sixth embodiment.

According to this embodiment, the surface S2 (shown in FIG. 5) of the second branch 102 is turned back over itself so that the second outlet zone ZS2 substantially forms a ring.

It should be noted moreover that each cavity 131 or each insert 132 considered above can either be entirely included in the light guide 10, or it can emerge on at least one side of the light guide 10.

While the system, apparatus, process and method herein described constitute preferred embodiments of this invention, it is to be understood that the invention is not limited to this precise system, apparatus, process and method, and that changes may be made therein without departing from the scope of the invention which is defined in the appended claims.

What is claimed is:

1. A light module for lighting and/or signaling for a motor vehicle, comprising:
    a light guide comprising at least first and second light inlet zones and at least first and second light outlet zones,
    a first light source arranged opposite said first light inlet zone of an inlet,
    a second light source arranged opposite said second light inlet zone of said inlet,
    said light guide being arranged so that the light coming from said first and second light sources is able to propagate in said light guide through each said first and second light inlet zones to an outlet of each of said first and second light inlet zones respectively, and
    said light module comprising moreover a first control device for controlling light in said light guide, said first control device being arranged so that said second light outlet zone partially overlaps said first light outlet zone,
    wherein said first control device comprises a confinement mechanism confining the propagation of the light coming from said second light source and for freely allowing the propagation of the light coming from said first light source throughout the light guide to said first and second light outlet zone, and confining the light coming from said second light source to said second light outlet zone.

2. The light module as claimed in claim 1, wherein said first and second light outlet zones have a part of their periphery in common.

3. The light module as claimed in claim 1, wherein said confinement mechanism comprises at least one cavity formed in said light guide and disposed so as to reflect totally the light coming from said second light source and propagating until it reaches said at least one cavity.

4. The light module as claimed in claim 1, wherein said confinement mechanism comprises at least one opaque or reflective insert, included in said light guide, and able to absorb and/or, respectively, to totally reflect the light coming from said second light source and propagating until it reaches said at least one opaque or reflective insert.

5. The light module as claimed in claim 3, wherein said confinement mechanism comprises a plurality of cavities and/or a plurality of inserts disposed in louvered manner substantially on a median plane separating said first and second light inlet zones.

6. The light module as claimed in claim 1, wherein said first control device comprises a notch formed in said light guide and separating said first and second light inlet zones.

7. The light module as claimed in claim 1, wherein said light guide comprises:
    a first branch defined between said first light inlet zone and the part of said first light outlet zone not overlapped by said second outlet light zone, and
    a second branch defined between said second light inlet zone and said second light outlet zone,
    said first and second branches being joined to each other by a junction surface less extensive than a surface of said second branch comprising said junction surface.

8. The light module as claimed in claim 7, comprising a second control device for controlling the propagation of light in the light guide, said second control device comprising said confinement mechanism arranged in said second branch substantially under a long edge of said junction surface in order to confine the propagation of the light coming from said first light source in such a way that said first and second light outlet zones overlap over a delimited zone of said second light outlet zone.

9. The light module as claimed in claim 7, wherein said surface of said second branch is turned back over itself in such a way that said second light outlet zone substantially forms a ring.

10. The light module as claimed in claim 1, wherein said first and second light sources have lighting and/or signaling functions which are different from each other.

11. The light module as claimed in claim 1, wherein said first and second light outlet zones have a part of their periphery in common.

12. The light module as claimed in claim 2, wherein said confinement mechanism comprises at least one cavity formed in said light guide and disposed so as to reflect totally the light coming from said second light source and propagating until it reaches said at least one cavity.

13. The light module as claimed in claim 2, wherein said confinement mechanism comprises at least one opaque or reflective insert, included in said light guide, and able to absorb and/or, respectively, to totally reflect the light coming from said second light source and propagating until it reaches said at least one opaque or reflective insert.

14. The light module as claimed in claim 3, wherein said confinement mechanism comprises at least one opaque or reflective insert, included in said light guide, and able to absorb and/or, respectively, to totally reflect the light coming from said second light source and propagating until it reaches said at least one opaque or reflective insert.

15. The light module as claimed in claim 4, wherein said confinement mechanism comprises a plurality of cavities and/or a plurality of inserts disposed in louvered manner substantially on a median plane separating said first and second light inlet zones.

16. The light module as claimed in claim 1, wherein said first control device comprises a notch formed in said light guide and separating said first and second light inlet zones.

17. The light module as claimed in claim 1, wherein said light guide comprises:
    a first branch defined between said first light inlet zone and the part of said first light outlet zone not overlapped by said second outlet light zone, and
    a second branch defined between said second light inlet zone and said second light outlet zone,
    said first and second branches being joined to each other by a junction surface less extensive than a surface of said second branch comprising said junction surface.

18. The light module as claimed in claim 17, comprising a second control device for controlling the propagation of light in the light guide, said second control device comprising said confinement mechanism arranged in said second branch substantially under a long edge of said junction surface in order to confine the propagation of the light coming from said first light source in such a way that said first and second light outlet zones overlap over a delimited zone of said second light outlet zone.

19. The light module as claimed in claim 8, wherein said surface of said second branch is turned back over itself in such a way that said second light outlet zone substantially forms a ring.

20. A light module for lighting and/or signaling for a motor vehicle, comprising:
- a light guide comprising at least first and second light inlet zones and at least first and second light outlet zones,
- a first light source arranged opposite said first light inlet zone of an inlet,
- a second light source arranged opposite said second light inlet zone of said inlet,
- said light guide being arranged so that the light coming from said first and second light sources is able to propagate in said light guide to said first and second light inlet zones of an outlet respectively,
- said light module comprising moreover a first control device for controlling light in said light guide, said first control device being arranged so that said second light outlet zone partially overlaps said first light outlet zone,
- a first branch defined between said first light inlet zone and the part of said first light outlet zone not overlapped by said second outlet light zone,
- a second branch defined between said second light inlet zone and said second light outlet zone,
- said first and second branches being joined to each other by a junction surface less extensive than a surface of said second branch comprising said junction surface, and
- a second control device for controlling the propagation of light in the light guide, said second control device comprising a confinement mechanism arranged in said second branch substantially under a long edge of said junction surface in order to confine the propagation of the light coming from said first light source in such a way that said first and second light outlet zones overlap over a delimited zone of said second light outlet zone.

* * * * *